March 31, 1959 R. B. DOME 2,880,315

ANGULAR MODULATION DETECTOR

Filed Oct. 5, 1954 2 Sheets-Sheet 1

INVENTOR:
ROBERT B. DOME,
BY Donald N. Timbie
HIS ATTORNEY.

ANGULAR MODULATION DETECTOR

Filed Oct. 5, 1954 2 Sheets-Sheet 2

INVENTOR:
ROBERT B. DOME,
BY Donald N. Timbie
HIS ATTORNEY.

United States Patent Office 2,880,315

Patented Mar. 31, 1959

2,880,315

ANGULAR MODULATION DETECTOR

Robert B. Dome, Geddes Township, Onondaga County, N.Y., assignor to General Electric Company, a corporation of New York Application October 5, 1954, Serial No. 460,317

5 Claims. (Cl. 250—27)

This invention relates to a detector for deriving from a phase or frequency modulated wave an output signal that varies in amplitude in accordance with the changes in phase or frequency.

In order to remove undesired variations in amplitude, it is customary to insert a limiter ahead of the detector. As is well understood by those skilled in the art, the limiter prevents voltages greater than a predetermined level from reaching the detector. The output of the detector is generally applied via suitable amplifiers to suitable utility means. When reasonably strong signals are received, the amplitude of the carrier wave applied to the limiter is greater than the limiting level so that the energy represented by the portion of the carrier wave extending above this level is prevented from reaching the detector and hence, from reaching the amplifiers and the utility means. However, undesired amplitude variations that combine with the carrier wave in such manner as to cause voltages in excess of the limiting level are also prevented from reaching the amplifiers and the utility means. In this way the effects of noise or undesired amplitude variations in the carrier wave signal are greatly reduced.

However, for reasons well known to those skilled in the art, it is difficult to establish the limiting level below approximately one volt. Now the amplifiers may be designed so as to provide useful output for the utility means for carrier wave amplitudes such as one one-hundredth (1/100) of a volt that are considerably less than one volt. Therefore, undesired amplitude variations lying between the carrier wave peaks and the one volt level are not affected by the limiter. These amplitude variations may be many times the amplitude of the carrier wave bearing the useful signal. Accordingly, it is highly desirable, under weak signal conditions, that the angular modulation detector have good amplitude modulation rejection characteristics. It is obviously desirable that the detector provide as much signal as possible.

The well-known Foster-Seeley detector provides adequate signal output, but has a poor amplitude rejection characteristic. On the other hand, the equally well-known ratio detector has reasonable amplitude rejection characteristic, but attenuates the signal to a marked degree. A further difficulty with the ratio detector is that it produces little or no amplitude modulation rejection under severe amplitude modulation conditions. Such a situation occurs, for example, when the amplitude of the carrier wave at the input of the limiter is suddenly decreased by the interference produced by the rotation of an airplane propeller. Such amplitude modulation produces "holes" in the output signal that are nearly as objectionable as noise peaks.

Accordingly, it is an object of this invention to provide an angular modulation detector having an improved amplitude rejection characteristic.

It is another object of this invention to provide an angular modulation detector that provides effective amplitude rejection even in the presence of high percentage amplitude modulation.

Another object of the invention is the provision of an angle-modulation detector having a good amplitude modulation rejection characteristic, and which has a minimum amount of signal attenuation.

One advantage of this invention is the provision of an improved angle-modulation detector that provides automatic gain control action such that the amplitude of the output signal does not change extensively in the presence of relatively large variations in the mean amplitude of the input signal.

It is a further object of this invention to provide an improved angle-modulation detector having a sufficiently high output signal level to permit the use of less sensitive output signal amplifiers than those previously used.

Briefly, these objectives may be attained in accordance with the principles of this invention as follows:

Means are provided for producing a first wave having amplitude variations corresponding to the angular modulation of the carrier wave. Means are provided for providing a second wave that is similar to the first wave, except that its amplitude variations are substantially out of phase with the amplitude variations of the first carrier wave. A circuit is provided for rectifying the first wave and another circuit is provided for rectifying the second carrier wave. The outputs of the rectifying circuits are added in like phase so as to produce the desired output signal. Suitable means may be provided for bypassing the frequencies of the carrier wave in such manner that they do not appear in the output signal. Each of the rectifying circuits may have non-linear operating characteristics such that the portion of the signal output voltage provided by each is proportional to a fractional power of the amplitude of the wave applied to the circuit. Such non-linear operating characteristics may be achieved in many ways. Linear rectifiers may be used and each of their outputs separately applied to non-linear devices or impedances, or non-linear rectifiers may be used in conjunction with linear or non-linear load impedances or devices. The desired non-linear operating characteristics may be achieved by use of a linear or non-linear rectifying circuit used in conjunction with non-linear coupling means or devices. The outputs of the devices or impedances, or coupling means are added to provide the desired output signal.

The manner in which these objectives may be attained in accordance with the principles of this invention will be better understood after a consideration of the following detailed discussion of the drawings in which.

Figure 1:
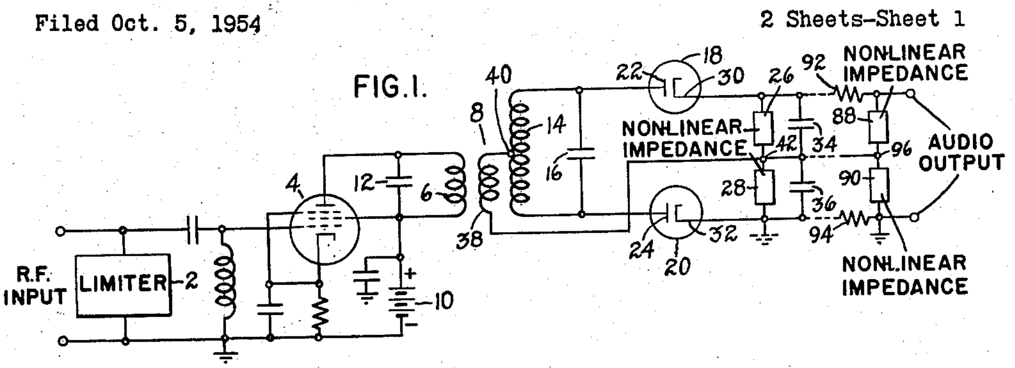
Figure 1 illustrates one embodiment of this invention in which the non-linear operating characteristic of the rectifying means is obtained is obtained by providing a non-linear load impedance.

In Figure 1, the general arrangement of the invention is as follows: A carrier wave of any suitable frequency having phase or frequency modulations, or combinations of both, may be applied to a limiter 2 and the output of the limiter may be applied to a suitable amplifying stage 4. The plate of the amplifier 4 is coupled via a primary winding 6 of a discriminator transformer 8 to a source 10 of positive fixed plate supply voltage. A condenser 12 is connected in parallel with the primary winding 6 and serves to form with the primary winding a parallel circuit that is resonant at the central frequency of the carrier wave. A secondary winding 14 of the discriminator transformer 8 is tuned to resonance at the central frequency of the carrier wave by a parallel capacitor 16. The primary winding 6 and the secondary winding 14 are loosely coupled so as to provide proper band-pass characteristics in a manner well known to those skilled in the art. Two unilaterally conducting devices or rectifiers 18 and 20, here shown as diodes, have similar elements, here shown as plates 22 and 24, respectively, connected to opposite ends of the secondary winding 14.

For the purpose of this invention it would be just as well if the diodes 18 and 20 were connected in opposite polarity from that shown. However, as illustrated, a load impedance 26 for the diode 18 and a load impedance 28 for the diode 20 are connected in series between the cathodes 30 and 32 of the respective diodes. Capacitors 34 and 36 serve to bypass the carrier wave frequencies around the load impedances 26 and 28, respectively, but have relatively high impedances for the signal frequencies. Hence, the capacitors 34 and 36 are effectively connected in series between the cathodes 30 and 32. Either of the cathodes may be grounded, but in this particular example, the cathode 32 is shown as being connected to ground. A tertiary winding 38 of the transformer 8 is tightly coupled to the primary winding 6 so that the voltages across the two windings are substantially the same. One end of the tertiary winding 38 is connected to a center tap 40 on the secondary winding 14 and the other end is connected to the junction 42 of the non-linear load impedances 26 and 28 and the capacitors 34 and 36.

It will be apparent to those skilled in the art that except for the non-linear impedances 26 and 28, the circuit of Figure 1 is similar to a Foster-Seeley detector. It will be recognized that the discriminator transformer 8 is only one of various means that may be used for deriving from an angularly-modulated carrier wave a first wave having an amplitude that increases as the angular modulation deviates toward one side of a predetermined neutral angular position and decreases as the angular variation deviates toward the other side of the neutral angular position. The means is also adapted to provide a second wave having amplitude variations that are similar to the amplitude variations of the first wave except that they are out of phase. In the particular example shown, the means for deriving these first and second waves may be thought of as one means. However, separate means could be employed such as two separately tuned secondary windings, or separate slope filters and the like. In any case, the first and second waves appear respectively between the junction 42 and the elements 22 and 24.

As in a Foster-Seeley-type detector, the capacitors 34 and 36 present a relatively high impedance to the signal frequencies represented by the angular variations of the carrier wave and the corresponding amplitude variations of the first and second waves. For reasons that will be subsequently explained, the resistance of the load impedances 26 and 28 may vary. The RC time constant of these impedances and the capacitors 34 and 36 respectively, is long with respect to the frequencies represented by the carrier wave, but short enough to permit the voltage across them to follow the amplitude variations of the first and second waves. Hence, a first signal appears across the load impedance 26 and a second signal appears across the load impedance 28. These load impedances could be coupled in various ways so that the signals across them are effectively added. In this particular example, the addition is accomplished by merely connecting them in series so that the desired output signal is obtained across them.

In accordance with the principles of this invention, the diode 18 and its load impedance 26 are so constructed as to form a circuit for deriving from the first wave, noted above, a first signal that varies in amplitude as a fractional power of the amplitude variations of the carrier wave and the diode 20 and its load impedance 28 constitutes a circuit for deriving from the second wave a second signal that varies in amplitude as a fractional power of the amplitude variations of the second wave. These fractional exponential relationships between the input and the output amplitudes can be brought about in various ways. For example, the diode could be so constructed as to provide the proper type of non-linearity, or the diode could be replaced by a rectifier having the desired degree of non-linearity. It is also possible that the desired non-linearity be provided by use of a suitable load impedance or combination of a non-linear rectifier and a non-linear load impedance.

In the embodiment of the invention shown in Figure 1, the desired non-linearity is effected by the load impedances 26 and 28 which have a non-linear resistance characteristic such that their resistance is proportional to a fractional power of the voltage applied across them. This means that the signal voltage across the load impedances 26 and 28 will be proportional to a fractional power of the first and second waves applied to the rectifiers. The non-linear load impedances 26 and 28 can be made of silicon carbide which is sometimes referred to as thyrite.

Figure 1A:
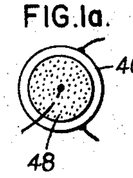
Figures 1A, 1B and 1C illustrate one form that the non-linear load impedances of Figure 1 and other figures may assume.
Figure 1B:
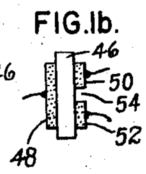
Figure 1C:
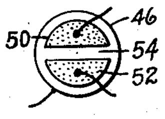

As will become apparent during the subsequent explanation of the operation of a detector constructed in accordance with the principles of this invention, the particular fractional power of the applied voltage to which the resistance of the load impedances 26 and 28 is proportional may be varied within wide limits. However, it will also be apparent that the non-linear characteristics of each load impedance should be substantially identical in order to secure the best results. Whereas the resistance characteristics of thyrite material may vary from batch to batch or piece to piece, each piece is likely to be homogeneous within itself. Therefore, in accordance with another feature of this invention, the load impedances of Figure 1 may be made, as illustrated in Figure 1A, 1B and 1C, from a single wafer 46 of silicon carbide. Ordinarily, each side of the wafer is coated with a thin coating of metal. One coating 48 is left intact and a lead connected to it, as by soldering or any other suitable method. This lead is connected to the junction 42. The coating on the other side is separated into two parts 50 and 52 as by filing or cutting away the coating along a diameter 54. Leads are electrically connected between the portions 50 and 52 and the cathodes 30 and 32.

It will now be demonstrated that load impedances having characteristics such as silicon carbide in the form of thyrite or the equivalent will cause the signals appearing across them to be proportional to the fractional power of the amplitude of the waves applied to the corresponding rectifiers. As stated in section 3–26 of the Electrical Engineer's Handbook by Pender and McIlwain which was published in 1950 by John Wiley and Sons, Inc., the current through a mass of thyrite or silicon carbide may be expressed as follows:

$$I=C_1E_0+C_2E_0^n \qquad (1)$$

where $C_1$ and $C_2$ are constants and $E_0$ is the voltage across the mass of thyrite and $n$ is an integer (usually varying from 3.5 to 7.0).

Assuming that the term $C_1E_0$ can be neglected, and solving Equation 1 for $E_0$ $$E_0=KI^{1/n} \tag{2}$$

where K is a new constant.

Assume that the source voltage is $E_1$, which in the circuit of Figure 1 is the amplitude of the carrier wave between one end of the secondary winding 14 and the junction 42. Assume further that the impedance seen by the load impedance is $r$ and that the resistance of the load impedance is R. $E_0$ is of course the portion of $E_1$ appearing across the load impedance. Based on these assumptions, the current I flowing in the circuit is $$I=\frac{E_1}{r+R} \tag{3}$$

Substituting the expression into Equation 2 yields $$E_0=K\left(\frac{E_1}{r+R}\right)^{1/n} \tag{4}$$

If the resistance $r$ is large with respect to the resistance R of the load impedance, then $$E_0=K\left(\frac{E_1}{r}\right)^{1/n} \tag{5}$$

and $$E_0=K_1E_1^{1/n} \tag{6}$$

Figure 2:
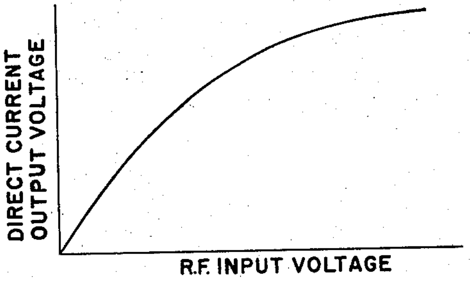
Figure 2 is a graph illustrating the general type of non-linear characteristic that the rectifying means should have.

Hence the signal voltage $E_0$ appearing across each load impedance varies with a fractional power of the amplitude of the carrier wave applied to its rectifier as illustrated in the graph of Figure 2.

Figure 3:
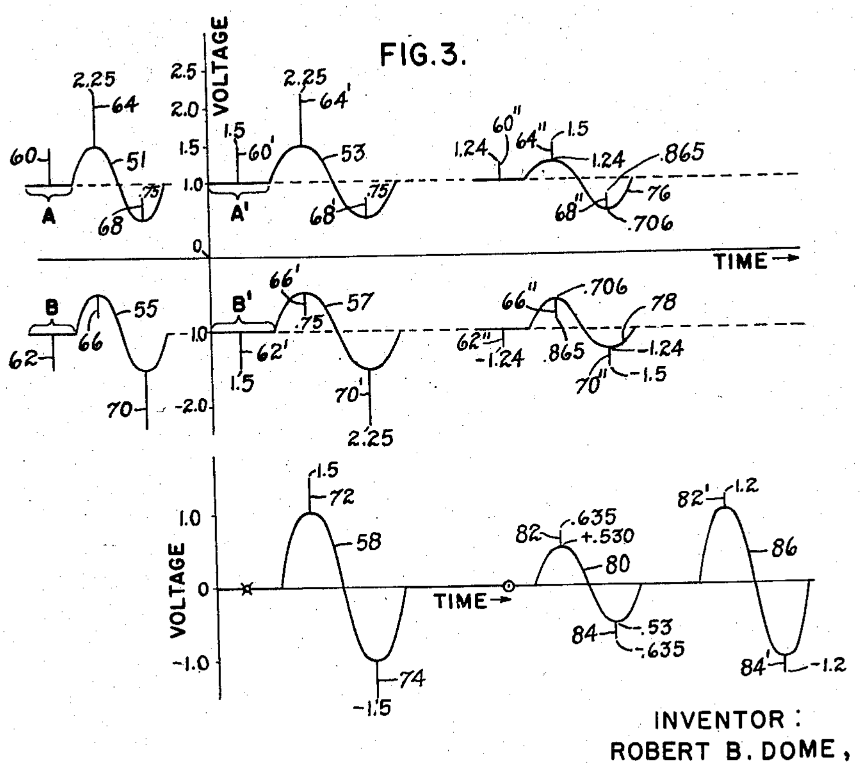
Figure 3 is a series of graphs useful in explaining the operation of the invention.

The following is an explanation made with the aid of the graphs of Figure 3 of a known type of linear detector. Such a detector could be made by substituting linear resistors for the load impedances 26 and 28 of Figure 1. A wave 51 of Figure 3 represents the envelope of the carrier wave appearing between the upper end of the secondary winding 14 and the junction 42.

A corresponding wave 53 of Figure 3 indicates the voltage of the upper end of the load impedance 26 with respect to the junction 42. When the carrier wave between the upper end of the winding 14 and the junction 42 is at the central frequency of the transformer 8, it is assumed, for the purpose of this explanation, to have an amplitude of 1 volt. This condition is illustrated by the portion A of the wave 51 and A' of the output wave 53. As the frequency or phase of the carrier wave deviates about the central frequency, its amplitude varies about the one volt level as shown by the rest of the wave 51. A wave 55 represents the envelope of the carrier wave appearing between the lower end of the secondary winding 14 and the junction 42. A corresponding wave 57 indicates the voltage of the junction 42 with respect to ground. At the central frequency, the carrier wave is assumed to have an amplitude of one volt. This condition is indicated by the portions B and B' of the waves 55 and 57. As the carrier wave deviates about its central frequency or phase, its amplitude varies about a one volt level as shown by the rest of the wave 55 and the voltage of the junction 42 with respect to ground varies as the rest of the wave 57.

It is apparent that the output signal that appears across both load impedances 26 and 28 may be attained by simply adding the waves 53 and 57. The result is represented by a wave 58.

A linear detector operates as follows in the presence of undesired amplitude variations of the carrier waves as indicated by the waves 51 and 55 where these variations modulate the carrier wave by 50%, i. e., in the particular example where the amplitude is varied by ±one half a volt. Let it also be assumed that the undesired amplitude variations are in the form of three noise spikes, one of these spikes occurring when the carrier wave is at its central frequency or phase and produces spikes 60 and 62 in the waves 51 and 55. A second spike occurs at one extreme end of the carrier deviation from the central frequency or phase and produces spikes 64 and 66. A third spike occurs at the other extreme of carrier deviation and produces spikes 68 and 70. These spikes also appear in the separate rectifier outputs with corresponding numbers primed.

At this point it should be mentioned that for reasons well known to those skilled in the art, the noise spikes generally increase the amplitude of the carrier waves. Accordingly, the spikes 60, 64 and 68 have been indicated as increasing the positive potential applied to the diode 18 so that the rectifier circuit output has positive spikes of noise as indicated by the spikes 60', 64' and 68'. The spikes 62, 66 and 70 have been drawn so as to indicate an increase in the negative potential applied to the diode 20 and accordingly they produce at the output negative-going spikes 62', 66' and 70'.

Another point to be noted is that noise spikes appearing at the primary winding 6 produce spikes of equal amplitude in the waves 51 and 55 when the carrier wave is at the central frequency or phase, as is indicated by the spikes 60 and 62. However, when the carrier deviates from this central position, the relative amplitudes of the carrier waves applied to the rectifiers vary in a well known manner. However, the amplitude of the noise spikes applied to the rectifiers varies in a similar manner. Hence, during the sections A of the waves 51 and 55, when the carrier is at its central frequency or phase, the spikes 60 and 62 have equal amplitude, here assumed to be one half a volt. When the carrier deviates in one direction, its amplitude at the plate of the diode 18 increases one and one half times, as indicated by the first half cycle of the wave 51. The noise spike 64 is, therefore, shown as being one and one half times as big or three quarters of a volt. At the same time, the amplitude of the carrier wave applied to the diode 20 decreases by a factor of one half, as indicated by the first cycle of the wave 55, and the noise pulse 66 is half as large or one quarter volt. When the carrier deviates in the opposite direction, the amplitude of the carrier wave applied to the diode 18 decreases by a factor of one half, as indicated by the second half cycle of the wave 51 and the noise spike 68 decreases by the same amount or to one quarter volt. At the same time, the amplitude of the carrier wave applied to the diode 20 increases in amplitude by a factor of one and one half times, as indicated by the second half cycle of the wave 55 and the noise spike is also increased by a factor of one and one half or to three quarter volts, as indicated by the spike 70. In a linear rectifier, the corresponding spikes appearing in the separate rectifying circuit outputs and indicated by similar numerals primed have the same relative amplitudes. For ease in analyzing the operation of the linear detector, the voltage of the tips of the noise spikes 60', 64', 68', 62', 66' and 70' have been indicated in the drawing.

The inherently poor noise rejection characteristic of a linear detector may be understood from the following analysis of the waves 53, 57 and 58 with their attendant noise spikes. The spike 60' makes the upper end of the load resistor 26 1.5 volts positive with respect to the junction 42 and the spike 62' makes the junction 42 1.5 volts negative with respect to ground. Therefore, these spikes of noise exactly cancel as indicated at point X on the output signal wave 58. However, the spike 64' makes the upper end of the load 26 2.25 volts positive with respect to the junction 42 and the noise spike 66' makes the junction 42 only 0.75 volt negative with respect to ground. Therefore, the resultant noise spike 72 in the output signal wave 58 reaches an amplitude of 1.5 volts. It will be noted that the signal at this point has an amplitude of 1.0 volt so that the noise spike has an amplitude of 0.5 volt which is exactly the same amplitude of the noise spikes 60′ and 62′. Therefore, there is no noise rejection at all. In a similar manner the noise spikes 68′ and 70′ produce a resultant noise spike 74 in the output signal.

The operation of the embodiment of the invention shown in Figure 1 is as follows: Here, in accordance with the invention, the load impedances 26 and 28 are non-linear such that the voltage appearing across each is proportional to a fractional power of the amplitude of the carrier wave represented by the waves 51 and 55 respectively. In this particular example, let it be assumed that the relationship is such that the output signal $E_0$ of each rectifier circuit is equal to the input voltage $E_1$ represented by the waves 51 and 55 raised to the one half power or $E_0=E_1^{1/2}$.

Therefore, the signals provided by each of the rectifier circuits constructed in accordance with this invention may be attained by making the waves 76 and 78 that represent these signals equal to the square root of the waves 51 and 55 respectively. Whereas the applied waves 51 and 55 are symmetrical, the corresponding signal waves 76 and 78 are seen to be unsymmetrical. The resultant output signal appearing across both load impedances and derived by algebraically adding the waves 76 and 78 is represented by a wave 80. This quare root relationship also applies to the noise spike so that the spikes 60, 64 and 68 appear across the load impedance 26 as spikes 60″, 64″ and 68″, and the spikes 62, 66 and 70 appear across the load impedance 28 as spikes 62″, 66″ and 70″. For convenience, the voltages at the peaks of the spikes have been indicated in the drawing. As in the case of the linear rectifier, the spikes 60″ and 62″, that occur when the carrier wave is at its central frequency or phase, cancel as indicated by point 0 in the wave 80. However, the spikes 64″ and 66″ combine to produce a spike 82 and the spikes 68″ and 70″ combine to produce a spike 84. Each of these spikes has an amplitude of only .105 volt.

However, in this particular example, the output signal 80 is seen to be smaller than the output signal 58 of a linear detector. Therefore, in order to give a more accurate comparison of the output signals of the linear detector of the prior art and the non-linear detector of this invention, the output signal 80 has been proportionately increased, as indicated by the wave 86 wherein the useful signal has the same amplitude as the useful signal in the wave 58, i.e., an amplitude of one volt. The noise spikes 82 and 84 now appear as spikes 82′ and 84′ each having an amplitude of 0.2 volt. Hence, for the same amplitude of output signal a prior art linear detector produces, in this example, noise spikes of 0.5 volt whereas the non-linear detector of this invention produces noise spikes of only 0.2 volt. In this example, the noise occurring at the extreme of the carrier wave deviation has been reduced by 60%.

If a further degree of non-linearity is desired in the arrangement of Figure 1, this can be obtained by the addition of additional non-linear load impedance elements 88 and 90. The upper end of the load impedance 88 is coupled to the cathode 30 of the diode 18 via a relatively large isolating impedance, here shown as resistor 92, and the lower end of the lower impedance 90 is coupled to the cathode 32 via a relatively large isolating resistor 94. The junction 42 between the load resistors 26 and 28 is extended to a junction 96 that is between the load impedances 88 and 90. A ground is attached at the right hand side of the resistor 94 and the original ground that was attached directly to the cathode 32 is removed. In this arrangement the output signal appearing across both the load impedances 88 and 90 will be obtained by taking the square roots of the waves 76 and 78 of Figure 3 and adding them to produce a new resultant wave in a manner similar to that by which wave 80 was constructed. It will, therefore, be apparent that further non-linear elements can be added to obtain any desired degree of non-linearity.

In the embodiment of the invention illustrated by Figure 1, the desired degree of non-linearity was achieved by employing non-linear load impedances. However, as indicated in the Figure 4, the desired non-linearity may be obtained by using linear load impedances, linear rectifiers and then coupling the voltages appearing across the linear load to successive circuits via non-linear elements.

The upper end of a primary winding of a discriminator transformer is herein shown as being coupled via a condenser 100 to a center tap 102 on the secondary winding 104. The secondary winding is tuned for resonance at the carrier frequency in the usual manner by a condenser 106. The upper end of the secondary winding 104 is connected to the cathode 108 of a diode 110 and the lower end is connected to a cathode 112 of a diode 114. The plates 116 and 118 of these diodes are coupled to ground for carrier frequencies via condensers 120 and 122 respectively. Linear load impedances 124 and 126 are connected in series between the plates 116 and 118 as shown. A D.-C. return path for each of the rectifier circuits is provided by connecting a choke 128 between the center tap 102 and a junction 130 between the linear load impedances 124 and 126.

In order to obtain the desired non-linear characteristics, a non-linear element 132 is connected in series with a relatively large resistor 134 between the plate 116 and the junction 130. Another non-linear element 136 is connected in series with a relatively large resistor 138 between the junction 130 and the plate 118. The right hand end of the resistor 138 is connected to ground. The output signal may be obtained as indicated across the non-linear elements 132 and 136. As in Figure 1, the non-linear elements may be termed non-linear load impedances 132 and 136 and have such a characteristic that they produce output voltages which are proportional to a fractional power of voltages appearing across the linear load impedances or resistors 124 and 126. It is believed that the explanation of the operation of this circuit is substantially the same as the explanation given for Figure 1 and, therefore, no further explanation is herein presented.

Figure 4:
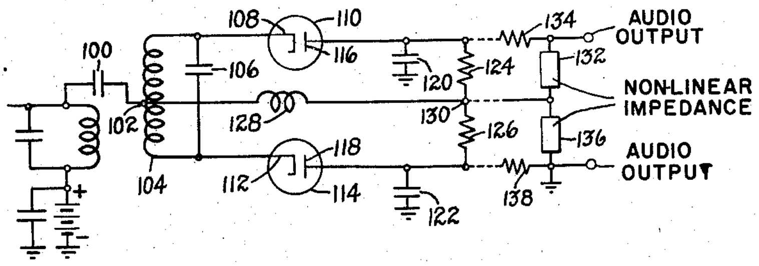
Figure 4 is an embodiment of the invention employing linear rectifying means and non-linear coupling means.

In each of the previous embodiments of the invention that have been discussed, i.e., Figure 1 and Figure 4, the degree of non-linearity has been produced by using non-linear resistive elements such as thyrite, etc. and linear rectifiers such as diodes.

Figure 5:
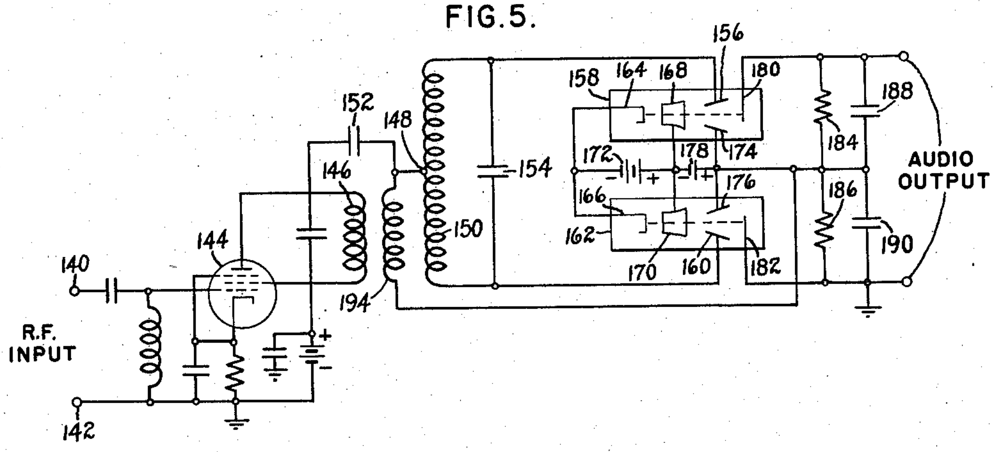
Figure 5 illustrates an embodiment of the invention wherein the rectifying means is provided with a suitable non-linear characteristic by use of a non-linear rectifier and a linear load impedance.

In Figure 5 the desired degree of non-linearity is provided by using non-linear rectifiers in place of the substantially linear diodes. In this embodiment of the invention frequency or phase modulated carrier waves are applied between input terminals 140 and 142, the latter being grounded. An amplifier 144 is coupled to these input terminals in the usual manner and its output voltage appears across a primary 146 of a discriminator transformer. The upper end of the primary winding 146 is coupled to a center tap 148 in a secondary winding 150 via a condenser 152. The secondary winding 150 is tuned to resonance at the central or neutral frequency of the carrier wave by a condenser 154. The upper end of the secondary winding 150 is connected to an upper deflection plate 156 of a special cathode-ray tube 158 and the lower end of the secondary winding 150 is connected to a lower deflection plate 160 of a similar cathode-ray tube 162. Each of the cathode-ray tubes 158 and 162 are provided with means such as an electron gun for forming a horizontal, narrow astigmatic beam of electrons. Such means have been illustrated in this particular showing as being comprised of cathodes 164 and 166 and beam-forming elements 168 and 170. A suitable biasing potential is established between the cathodes and the beam-forming elements via battery 172. A lower deflection plate 174 of the cathode-ray tube 158 and an upper deflection plate 176 of the cathode-ray tube 162 are connected together and are biased positively with respect to the beam-forming elements 168 and 170 by means such as a battery 178. Under conditions when no carrier voltages are applied to the deflection plates 156 and 160, the positive potential thus applied to the deflection plates 174 and 176 will cause the beam of electrons to impinge on the edges of targets 180 and 182 as indicated by the dotted lines in Figure 5.

Figure 5A:
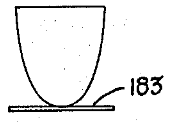
Figure 5A illustrates certain details of the particular non-linear rectifier illustrated by way of example in Figure 5.

As seen from the cathode ends of tubes 158 and 162, the targets 180 and 182 have a shape as illustrated in Figure 5A. When no carrier is present, the beams are focused approximately at the tip of their respective targets as illustrated by the line 183 in Figure 5A. When a carrier wave is present, the cathode-ray beams oscillate about the line 183. During one half cycle the beam impinges upon its target and during the other it is moved away from the target. If now the carrier is amplitude modulated by the desired signal, the peak excursion of the beam will follow the modulator envelope, being deflected more for positive modulation peaks and less for negative modulation peaks. The amount of output signal will depend upon the area of the beam intersected by the target and, therefore, the target may be cut so as to produce any desired amount of non-linearity. The current flowing from the targets 180 and 182 respectively flows through load resistors 184 and 186. These resistors are connected in series, as shown, and the A.-C. bypass is provided by condensers 188 and 190 around the load resistors 184 and 186 respectively. A D.-C. return path is provided by connecting a choke 194 between the center tap 148 and the junction between resistors 184 and 186. It is also to be noted that in this example the deflection plates 174 and 176 are also connected to the junction between the load resistors 184 and 186 and the bypass condensers 188 and 190. If desired, the load impedances 184 and 186 could be non-linear elements made of thyrite or other equivalent material.

In this embodiment the cathode-ray tubes 158 and 162 form one type of non-linear detector that may be employed in the circuit. It is, therefore, understood that other types of non-linear detectors may be provided and further that such non-linear detectors are merely one form of means for providing an output voltage that is proportional to a fractional power of the input voltage.

Figure 6:
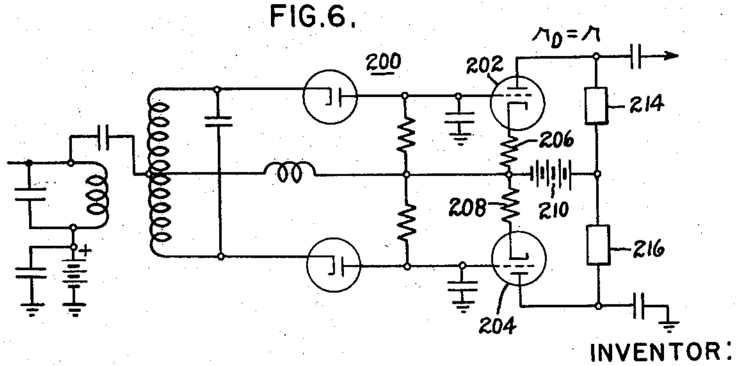
Figure 6 illustrates an embodiment of the invention in which linear rectifying means and non-linear coupling means are used.

Figure 6 shows an adaptation of the principles of this invention to a linear detector such as the Foster-Seeley-type. It is not thought necessary to give a further explanation of the operation of such detector and, therefore, it is merely indicated by a reference numeral 200. The output of one rectifier is applied between the grid and cathode of a suitable amplifier 202 and the output of the other rectifier is coupled between the grid and cathode of a suitable amplifier 204. A suitable amount of bias is provided by cathode resistors 206 and 208. The outputs of the amplifiers 202 and 204 are respectively connected to a source 210 of positive potential via non-linear elements 214 and 216. It will be apparent to one skilled in the art from the foregoing discussion of other embodiments of the invention that the amplifiers 202 and 204 will produce outputs which are in proportion to fractional powers of the voltages applied between the grids and cathodes. However, it is important to note, that here again the individual outputs of the non-linear elements are combined in series before being applied to the output circuits.

The following mathematical explanation of the principles of operation of the non-linear detectors of this invention is presented as a supplement to the graphical explanation given above.

When FM and AM are simultaneously present on the incoming wave, where FM is the desired signal and AM is the undesired signal, the R.F. envelope presented to one diode is generally of the form (7) $$e_1=e\,(1+m\sin\mu t)\,(1+n\sin vt)$$

and the voltage applied to the other diode is (8) $$e_2=e\,(1-m\sin\ t)\,(1+n\sin \nu t)$$

where $m$=effective envelope modulation by the FM signal
$\mu=2\pi$ (FM modulating frequency)
$n$=modulation factor of the amplitude modulation
$\nu=2\pi$ (AM modulating frequency)

The combined output of the two detectors, each working with an exponent $p$, would then be (9) $$E_0=e_1^p-e_2^p$$

or

(10) $$E_0=[e(1+m\sin\mu t)\,(1+n\sin\nu t)]^p-[e(1-m\sin\mu t)\,(1+n\sin vt)[^p$$

The minus sign is used between the two bracketed quantities because of the back-to-back connection between the rectifiers with respect to ground and the output terminal.

Now if there is no amplitude modulation, i.e., if $n=0$, the resultant recovered FM audio component may be readily computed. In this case

(11) $$E_0=e^p\{[1+m\sin\mu t]^p-[1-m\sin\nu t]^p\}$$

This equation may of course be expanded by the use of well known binomial series. The result is

(12)
$$E_0=2e^p\left\{pm\sin\mu t+\frac{p(p-1)(p-2)m^3\sin^3\mu t}{3!}+\frac{p(p-1)(p-2)(p-3)(p-4)m^5\sin^5\mu t}{5!}+\ldots\right\}$$

Now in FM discriminators, the peak separation in the current designs is such that with normal deviation of 100%, the value of $m$ is seldom greater than 0.3; that is $a\pm25$ kc. deviation will not show at either diode as a change in R.F. input of greater than ±30% from the mean value. Furthermore, for purposes of ease in calculation, let $p=0.2$, a very probable value. Then at maximum deviation (where $m=0.3$), and letting $e=1$,

(13) $$E_0=2(0.06\sin\mu t+0.0013\sin^3\mu t+\ldots)$$

(14) $$=2(0.061\sin\mu t-0.000325\sin^3\mu t+\ldots)$$

Thus under maximum swing conditions, the third harmonic distortion is only

(15) $$\frac{0.000325}{0.061}=0.0053$$ or about ½ of 1% and is, therefore, negligible.

The fundamental output of course from Equation 12 is down in level because the factor $p$ appears as a multiplier. In this example, where $p=0.2$, the output would be only 20% of the output of a high-level FM discriminator. This is still much higher output than is obtainable from a well-designed ratio detector.

Now the detector will be examined for its AM rejection qualities. By inspection of Equation 10, it is evident that AM will be completely rejected when there is no frequency modulation, or when $m=0$. In this respect, it is no different from other balanced discriminators. Now as $m$ slowly increases from zero, the AM will be observed to increase from zero too. Let us stop the sin $\mu t$ wave at its crest, or when sin $\mu t=1.0$. Then Equation 10 becomes

(16) $$E_0=e^p\{[(1+m)\,(1+n\sin\nu t)]^p-[(1-m)\,(1+n\sin\nu t)]^p\}$$

Since interest lies in the amplitude of sin $\nu t$, let the time function be arrested at the time when sin $\nu t=1.0$. Then Equation 16 is $$(17)\quad E_0=e^p\{[(1+m)\ (1+n)]^p-[(1-m)\ (1+n)]^p\}$$

Expanding in binomial series form, $$(18)\quad E_0=2pme^p\left\{1+n+\frac{2n(p-1)(1+n)}{2!}+\ldots\right\}$$

Since interest lies only in that part within the braces and since $m$ does not appear here, Equation 17 may be simplified by letting $m=1$, which makes the second bracket term zero, thus $$(19)\quad E_0=2^pe^p(1+n)^p$$

Expanding, $$(20)\quad E_0=2^pe^p\left(1+np+\frac{p(p-1)n^2}{2!}+\frac{p(p-1)(p-2)n^3}{3!}+\ldots\right)$$

In a similar manner, in Equation 16, if sin $\nu t=-1$, $$(21)\quad E_0=2^pe^p\left(1-np+\frac{p(p-1)n^2}{2!}-\frac{p(p-1)(p-2)n^3}{3!}+\ldots\right)$$

The amplitude of the AM components is the average between the parts in parentheses of Equations 20 and 21, or is $$(22)\quad E=np+\frac{p(p-1)(p-2)n^3}{3!}+\frac{p(p-1)(p-2)(p-3)(p-4)}{5!}n^5+\ldots$$

The AM output at the crest of an FM cycle is, therefore, as the result of using a fractional power detector, reduced from its value with $p=1$ to a lower value, the multiplying factor $\alpha$ of which is Equation 22 divided by $n$, or $$(23)\quad \alpha=p\left[1+\frac{(p-1)(p-2)n^2}{3!}+\frac{(p-2)(p-2)(p-3)(p-4)n^4}{5!}+\ldots\right]$$

One of the advantages of this invention is that there is no "break-out" point in AM rejection. This can be illustrated by assigning values to $p$ and $n$ in Equation 23 and plotting the results as a function of $n$. For example, if $p=1/5$, the following values for $\alpha$ are obtained at the crest of the FM cycle.

*Table I*

| $n$ | $\alpha$ | $\alpha$ in decibels |
|---|---|---|
| 0 | 0.200 | 13.98 |
| 0.2 | 0.202 | 13.90 |
| 0.3 | 0.205 | 13.78 |
| 0.5 | 0.214 | 13.40 |
| 0.7 | 0.232 | 12.70 |
| 0.9 | 0.281 | 11.04 |
| 0.95 | 0.312 | 10.10 |
| 1.00 | 0.574 | 4.84 |

It will be observed that good attenuation is maintained even up to 95% of the original AM modulation, a performance not ordinarily found in commercially designed ratio detectors, many of which break at about 50% original AM modulation. In contrast, my detector shows less than 0.86 db loss in attenuation (from 13.98 db down to 13.40 db).

The I.R.E. method of measuring AM suppression is to modulate the carrier with two frequencies simultaneously. One modulation is AM at 30% modulation factor. The other modulation is FM at 30% of system maximum deviation. The audio frequency output of the detector is filtered through two filters and read as separated signals. It is evident that this method of measurement in any balanced discriminator immediately give a suppression factor of $$0.3\times\frac{2}{\pi}=0.191,\text{ or }14.38\text{ db}$$

Since from Table I, $\alpha=13.78$ db at $n=0.3$, the I.R.E. figure for amplitude modulation suppression would be 13.78+14.38=28.16 db, for the case where $p=0.2$ and $m=0.3$.

The output of the detector system varies according to Equation 6 and hence the system possesses inherent A.G.C. characteristics. Thus, if $p=0.2$, the following table of relative output vs. input levels may be computed, based on $K=1$.

*Table II*

| Input=$e$ | Output=$Ke^p$ |
|---|---|
| 1.0 | 1.00 |
| 10.0 | 1.585 |
| 100.0 | 2.512 |

Thus, for an input change of 100 to 1, the output varies only 2.512 to 1, a very much improved A.G.C. factor.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. A detector for deriving an output signal having an amplitude that varies in accordance with angular variations of a carrier wave comprising, in combination, means for deriving from an angularly-modulated carrier wave a first wave having an amplitude that increases as the angular modulation of the carrier wave deviates toward one side of a predetermined neutral angular position and decreases as the angular variation of the carrier wave deviates toward the other side of the neutral angular position, said means also being adapted to derive from the angularly-modulated carrier wave a second wave having an amplitude that decreases as the angular variations of the carrier wave deviate toward the one side of the neutral angular position and that increases as the angular variations of the carrier wave deviate on the other side of the neutral angular position, means for deriving from said first wave a first unilateral signal of a given polarity that varies in amplitude as a fractional power of the amplitude variations of said first wave, means for deriving from said second wave a second unilateral signal of a given polarity that varies in amplitude as a fractional power of the amplitude variations of said second wave and means for adding said first and second unilateral signals with opposed polarities to provide said output signal.

2. A detector for deriving an output signal having an amplitude that varies in accordance with angular variations of a carrier wave comprising, in combination, means for deriving from an angularly-modulated carrier wave a first wave having an amplitude that increases as the angular modulation of the carrier wave deviates toward one side of a predetermined neutral angular position and decreases as the angular variation of the carrier wave deviates toward the other side of the neutral angular position, said means also being adapted to derive from the angularly-modulated carrier wave a second wave having an amplitude that decreases as the angular variations of the carrier wave deviate toward the one side of the neutral angular position and that increases as the angular variations of the carrier wave deviate on the other side of the neutral angular position, a rectifier coupled so as to rectify the first wave, a load impedance connected in series with said rectifier, said load impedance including a non-linear element yielding an output voltage of a given polarity that is proportional to a fractional power of the first wave, a rectifier coupled so as to rectify the second wave, a load impedance connected in series with said latter rectifier, said last named load impedance including a non-linear element yielding an output voltage of a given polarity that is proportional to a fractional power of the second wave, and means for connecting the non-linear elements in series so that the outputs of said rectifiers are added with opposed polarities to provide said output signal.

3. A detector for deriving an output signal having an amplitude that varies in accordance with angular variations of a carrier wave comprising, in combination, means for deriving from an angularly-mounted carrier wave a first wave having an amplitude that increases as the angular modulation of the carrier wave deviates toward one side of a predetermined neutral angular position and decreases as the angular variation of the carrier wave deviates toward the other side of the neutral angular position, said means also being adapted to derive from the angularly-modulated carrier wave a second wave having an amplitude that decreases as the angular variations of the carrier wave deviate toward the one side of the neutral angular position and that increases as the angular variations of the carrier wave deviate on the other side of the neutral angular position, a first rectifying circuit including a first non-linear load for deriving across said first non-linear load a first unilateral signal of a given polarity from said first wave that varies in amplitude as a fractional power of the amplitude variations of said first wave, a second rectifying circuit including a second non-linear load for deriving across said second non-linear load a second unilateral signal of a given polarity from said second wave that varies in amplitude as a fractional power of the amplitude variations of said second wave, and means for adding said first and second unilateral signals with opposed polarities to provide said output signals.

4. A detector as set forth in claim 1 wherein each of said means for deriving said first and said second unilateral signals includes a unilateral current conducting device and a non-linear load impedance, the characteristic of said load impedance being such that its impedance decreases in accordance with a fractional power of the voltage applied across it.

5. A detector as set forth in claim 1 wherein each of said means for deriving said first and said second unilateral signals includes a non-linear rectifier, the operating characteristic of each of said rectifiers being such that the output voltage therefrom is proportional to a fractional power of the voltage applied thereto.

References Cited in the file of this patent

UNITED STATES PATENTS

| | | |
|---|---|---|
| 2,572,424 | Amos | Oct. 23, 1951 |
| 2,580,261 | Worcester | Dec. 25, 1951 |
| 2,600,292 | Heath | June 10, 1952 |
| 2,601,384 | Goodrich | June 24, 1952 |
| 2,620,439 | Dome | Dec. 2, 1952 |
| 2,710,350 | Van Dijkum | June 7, 1955 |